(12) United States Patent
Uemura et al.

(10) Patent No.: US 12,535,647 B2
(45) Date of Patent: Jan. 27, 2026

(54) LENS BARREL CAPABLE OF PREVENTING DEFORMATION OR DAMAGE CAUSED BY EXTERNAL FORCE AND OPTICAL APPARATUS

(71) Applicant: CANON KABUSHIKI KAISHA, Tokyo (JP)

(72) Inventors: Kohei Uemura, Tokyo (JP); Toru Ishimasa, Kanagawa (JP); Tatsuya Noi, Kanagawa (JP); Kota Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 343 days.

(21) Appl. No.: 18/327,275

(22) Filed: Jun. 1, 2023

(65) Prior Publication Data

US 2023/0393371 A1 Dec. 7, 2023

(30) Foreign Application Priority Data

Jun. 7, 2022 (JP) .................. 2022-092386

(51) Int. Cl.
*G02B 7/10* (2021.01)
*G02B 7/02* (2021.01)
*G02B 7/00* (2021.01)

(52) U.S. Cl.
CPC ............... *G02B 7/10* (2013.01); *G02B 7/021* (2013.01); *G02B 7/023* (2013.01); *G02B 7/026* (2013.01); *G02B 7/005* (2013.01)

(58) Field of Classification Search
CPC .......... G02B 7/10; G02B 7/021; G02B 7/023; G02B 7/026
See application file for complete search history.

(56) References Cited

U.S. PATENT DOCUMENTS

| 2009/0002847 A1* | 1/2009 | Nakada | .................. G02B 7/102 |
| | | | 359/702 |
| 2015/0160428 A1* | 6/2015 | Kudoh | .................. H04N 23/55 |
| | | | 359/511 |

FOREIGN PATENT DOCUMENTS

| JP | 2009-031786 A | 2/2009 |
| JP | 2019-132938 A | 8/2019 |

* cited by examiner

*Primary Examiner* — James A Dudek
(74) *Attorney, Agent, or Firm* — Cowan, Liebowitz & Latman, P.C.

(57) ABSTRACT

A lens barrel includes a lens and a holding member holds the lens. A guide barrel guides the holding member linearly movably in an optical axis direction of the lens. A cam ring is rotatably held about an optical axis of the lens with respect to the guide barrel and surrounds the guide barrel. The cam ring has a first contact portion opposed to the fixed member fixed to the guide barrel, in the optical axis direction. The fixed member has a second contact portion opposed to the first contact portion in the optical axis direction. When the cam ring is moved by an external force to approach the fixed member in the optical axis direction, the first contact portion and the second contact portion are brought into contact with each other, whereby rotation of the cam ring about the optical axis is restricted.

12 Claims, 14 Drawing Sheets

LENS BARREL CAPABLE OF PREVENTING DEFORMATION OR DAMAGE CAUSED BY EXTERNAL FORCE AND OPTICAL APPARATUS

BACKGROUND OF THE INVENTION

Field of the Invention

The present invention relates to a lens barrel and an optical apparatus, and more particularly to a lens barrel having a configuration in which a lens group is movably supported and enables prevention of deformation or damage caused by an external force, and an optical apparatus including the lens barrel.

Description of the Related Art

As a lens barrel (interchangeable lens) attached to a single-lens reflex camera and a lens barrel of a lens-integrated camera, there is known a lens barrel that linearly moves a portion (focus lens) of an integrated lens group in an optical axis direction when performing focusing (focus adjustment) on an object. For example, Japanese Laid-Open Patent Publication (Kokai) No. 2009-31786 discloses a technique for suppressing, in a case where an external force, such as an impact force, is applied to the focus lens, transmission of the external force to a drive mechanism for driving the focus lens.

In the technique disclosed in Japanese Laid-Open Patent Publication (Kokai) No. 2009-31786, in a case where a large external force is applied to the lens barrel, rotation of a cam ring is stopped to prevent e.g. a gear for rotating the cam ring from being damaged. However, when rotation of the cam ring is stopped, most of the external force is received by cam grooves formed in the cam ring, and hence there is a fear that deformation or damage may be caused in the cam grooves or cam followers which are engaged with the cam grooves. Further, if the cam grooves or the cam followers are damaged or deformed, driving performance is lowered when moving the lens in the optical axis direction.

SUMMARY OF THE INVENTION

The present invention provides a lens barrel that is hard to be deformed or damaged by an external force and is capable of maintaining driving performance.

In a first aspect of the present invention, there is provided a lens barrel including a lens, a holding member that holds the lens, a guide barrel that guides the holding member such that the holding member is linearly movable in an optical axis direction of the lens, a cam ring that is held such that the cam ring is rotatable about an optical axis of the lens with respect to the guide barrel and surrounds the guide barrel, and a fixed member that is fixed to the guide barrel, wherein the cam ring has a first contact portion that is opposed to the fixed member in the optical axis direction, wherein the fixed member has a second contact portion that is opposed to the first contact portion in the optical axis direction, and wherein when the cam ring is moved by an external force such that the cam ring approaches the fixed member in the optical axis direction, the first contact portion and the second contact portion are brought into contact with each other, whereby rotation of the cam ring about the optical axis is restricted.

In a second aspect of the present invention, there is provided an optical apparatus including a lens barrel, wherein the lens barrel includes a lens, a holding member that holds the lens, a guide barrel that guides the holding member such that the holding member is linearly movable in an optical axis direction of the lens, a cam ring that is held such that the cam ring is rotatable about an optical axis of the lens with respect to the guide barrel and surrounds the guide barrel, and a fixed member that is fixed to the guide barrel, wherein the cam ring has a first contact portion that is opposed to the fixed member in the optical axis direction, wherein the fixed member has a second contact portion that is opposed to the first contact portion in the optical axis direction, and wherein when the cam ring is moved by an external force such that the cam ring approaches the fixed member in the optical axis direction, the first contact portion and the second contact portion are brought into contact with each other, whereby rotation of the cam ring about the optical axis is restricted.

According to the present invention, it is possible to provide a lens barrel that is hard to be deformed or damaged by an external force and is capable of maintaining the driving performance.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
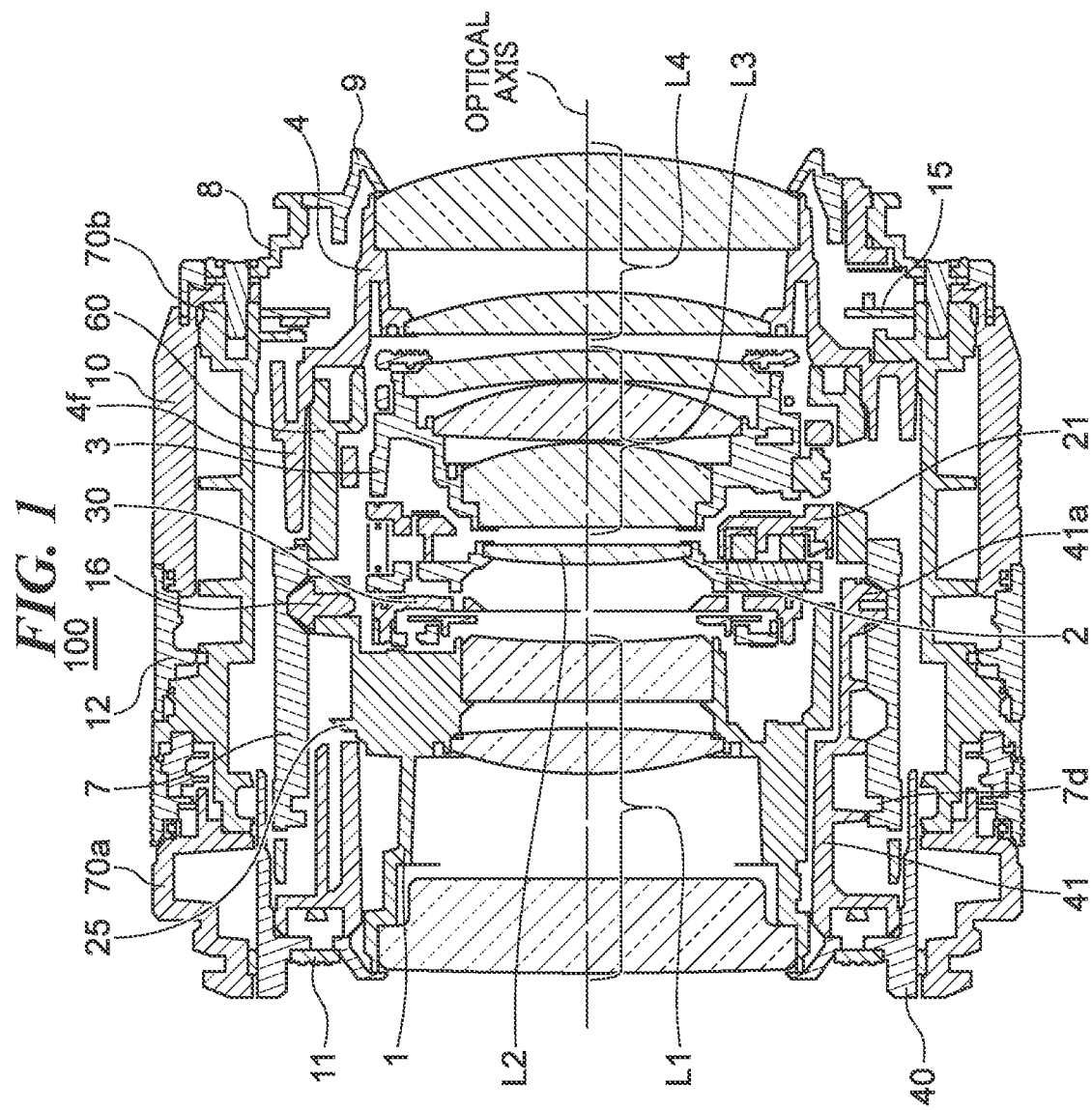
FIG. 1 is a cross-sectional view of a lens barrel according to an embodiment in a retracted state.
Figure 2:
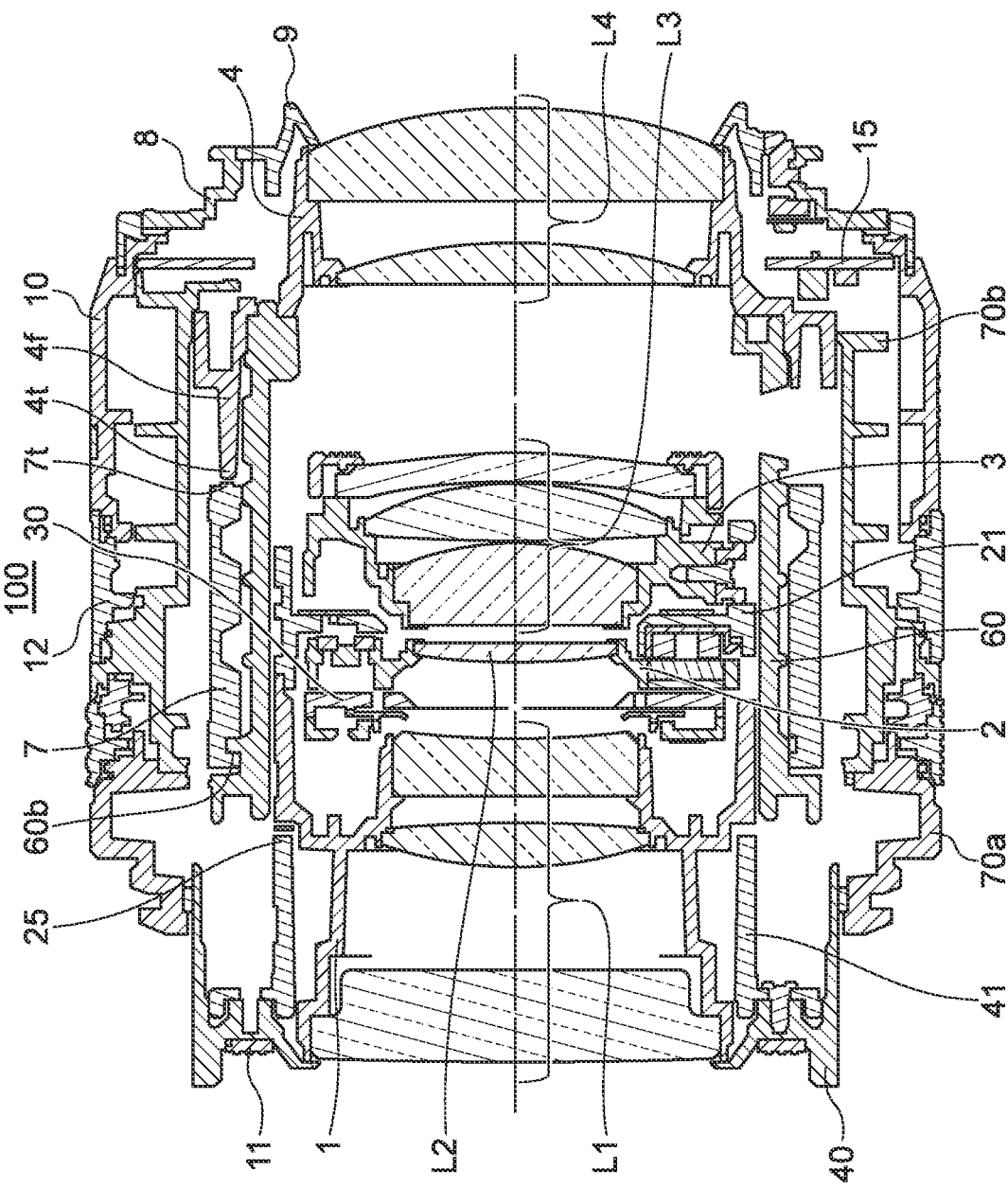
FIG. 2 is a cross-sectional view of the lens barrel in an extended state.
Figure 3:
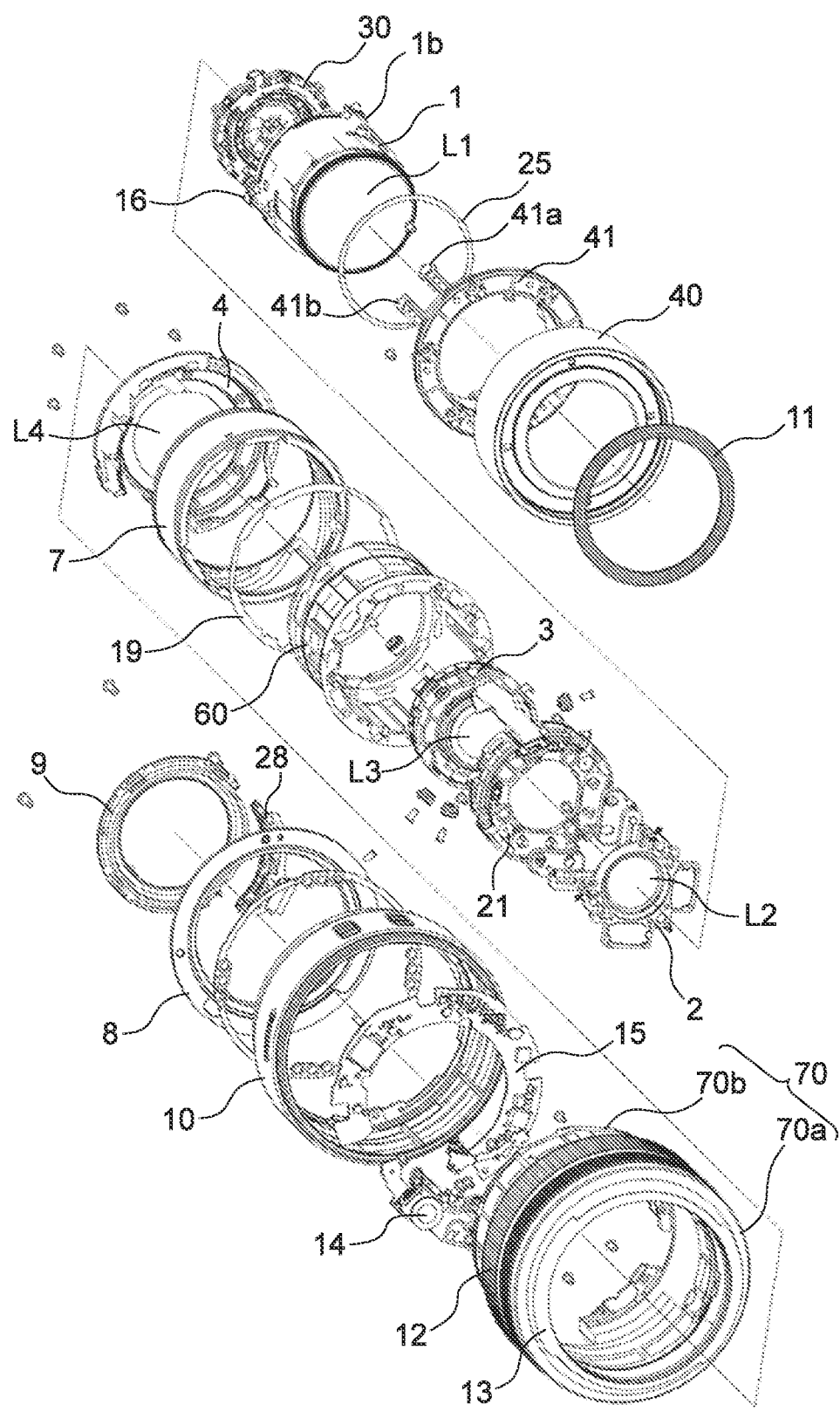
FIG. 3 is an exploded perspective view of the lens barrel.

FIG. 1 is a first cross-sectional view of a lens barrel 100 according to an embodiment, in a retracted state in which the lens barrel 100 is in an infinite photographing position. FIG. 2 is a second cross-sectional view of the lens barrel 100, in an extended state in which the lens barrel 100 is in a closest photographing position. FIG. 3 is an exploded perspective view of the lens barrel.

The first cross-sectional view in FIG. 1 shows a cross section including one of first cam followers 16 and one of second cam followers 41a, described hereinafter, and an optical axis, in the retracted state of the lens barrel 100. The second cross-sectional view in FIG. 2 shows a vertical cross section (cross section which includes the optical axis, and extends along a plane parallel to a height direction of an image capturing apparatus body) in a state in which the lens barrel 100 is attached to the image capturing apparatus body.

The lens barrel 100 is, more specifically, an interchangeable lens that can be attached and removed to and from the image capturing apparatus body (not shown) of e.g. a single-lens reflex camera. However, the lens barrel 100 may be integrally formed with the image capturing apparatus body. Further, the lens barrel 100 is used not only for a camera but can be applied to an optical apparatus other than the camera, such as a telescope (monocular).

The lens barrel 100 includes a mount 8 for mounting the lens barrel 100 to the image capturing apparatus body, and the mount 8 is fixed to a rear fixed barrel 70b. To the mount 8, a contact block 28 (see FIG. 3) is fixed to make it possible to communicate with the image capturing apparatus body and supply power from the image capturing apparatus body. Further, a back cover 9 is fixed to the mount 8. Note that the back cover 9 has a claw integrally formed thereon, and the back cover 9 is fixed to the mount 8 using the elastic force of the claw.

The rear fixed barrel 70b and a front fixed barrel 70a are connected to each other in an optical axis direction to form a fixed barrel 70. A focus ring 12 for performing focusing by a manual operation is arranged on the fixed barrel 70 such that the focus ring 12 is rotatable about the optical axis by a manual operation. On a front end of the front fixed barrel 70a, a hood mount 13 which makes it possible to attach and remove a hood, not shown, for blocking harmful incident light.

An exterior ring 10 is fixed to the rear fixed barrel 70b, and a circuit board 15 is fixed to the exterior ring 10. Electronic components are mounted on the circuit board 15. Further, the circuit board 15 is also connected to the contact block 28 via a flexible printed circuit board. An aperture device 30 and a motor unit 14 (see FIG. 3), described hereinafter, an encoder flexible printed circuit (FPC) 53 (see FIG. 13B), an AF/MF switch, a photo interrupter 18, and so forth, are electrically connected to the circuit board 15 via a flexible circuit board, not shown. Further, a microcomputer that performs a variety of driving control for the aperture device 30 and the motor unit 14 is mounted on the circuit board 15.

The lens barrel 100 includes a first lens group L1, a second lens group L2, a third lens group L3, and a fourth lens group L4. The first lens group L1, the second lens group L2, the third lens group L3, and the fourth lens group L4 are supported by a first lens-holding member 1, a second lens-holding member 2, a third lens-holding member 3, and a fourth lens-holding member 4, respectively.

The aperture device 30 is disposed between the first lens-holding member 1 and a second lens base plate 21 in the optical axis direction. The aperture device 30 includes a motor, not shown, as a drive source, and it is possible to adjust an amount of light passing through the lens barrel 100 by controlling the driving of the motor to change an opening area of aperture blades incorporated in the aperture device 30.

The first lens group L1, the second lens group L2, the third lens group L3, the fourth lens group L4, and the aperture device 30 form a photographing optical system of the lens barrel 100. In the lens barrel 100, the first lens group L1 to the third lens group L3 except the fourth lens group L4, and the aperture device 30 are main components of a moving lens group which can move in the optical axis direction in unison. Thus, in the lens barrel 100, the moving lens group is configured as a fixed focal length lens that moves in the optical axis direction when focusing on an object.

The first lens-holding member 1 is fixed to the second lens base plate 21 with screws (not shown) at three points. On an outer peripheral surface of the first lens-holding member 1, the first cam followers 16 each having a truncated cone shape are press-fitted and fixed at three points at substantially equally-spaced intervals in a circumferential direction such that the first cam followers 16 protrude outward. The second lens-holding member 2 is held by the second lens base plate 21 such that the second lens-holding member 2 is movable in a direction orthogonal to the optical axis and can be inclined with respect to the optical axis.

The fourth lens-holding member 4 has an outer peripheral flange portion 4f which is disposed in an opposed relation to a cam ring 7, described hereinafter, on an outer peripheral side of a guide barrel 60. The fourth lens-holding member 4 is a fixed member connected to the guide barrel 60 by fixing the outer peripheral flange portion 4f to the guide barrel 60.

The first lens-holding member 1 is engaged with the guide barrel 60. More specifically, holding portions provided on the first lens-holding member 1 so as to hold the first cam followers 15, respectively, are each formed with key portions 1b (see FIG. 3) on circumferentially opposite sides thereof. The key portions 1b are engaged with three linear grooves 60a (see FIG. 12) formed in the guide barrel 60, and with this engagement, the first lens-holding member 1 is made linearly movable in the optical axis direction.

The cam ring 7 is disposed in a fixed position in the optical axis direction such that the cam ring 7 surrounds an outer peripheral surface of the guide barrel 60 and is rotatable about the optical axis. The cam ring 7 is pressed against the guide barrel 60 toward the rear side (toward the mount 8) in the optical axis direction by the urging force of a wave washer 19 (see FIG. 3) disposed on a front side of the cam ring 7, whereby looseness of the cam ring 7 in the optical axis direction is suppressed.

Figure 4:
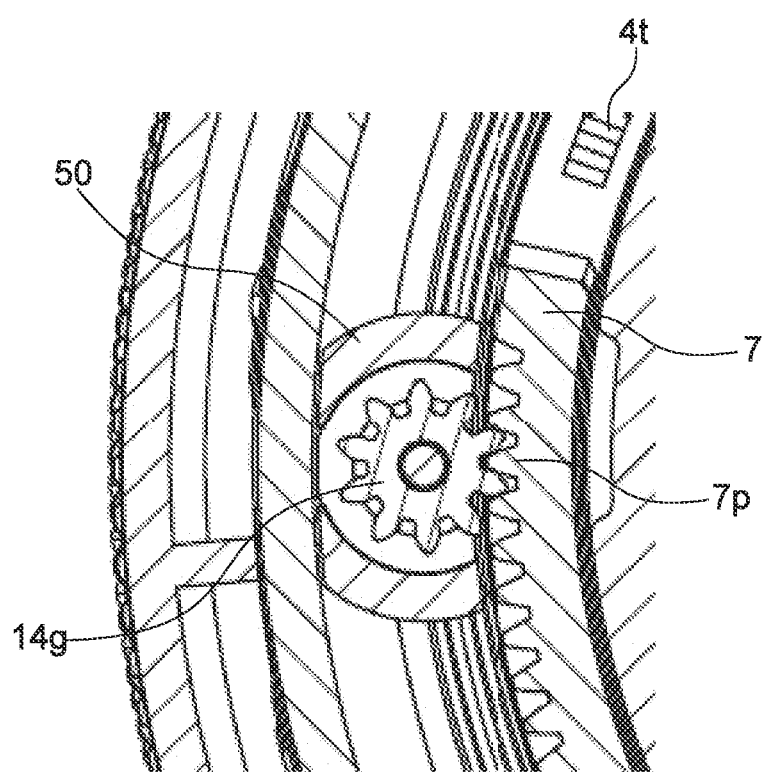
FIG. 4 is a cross-sectional view of a motor unit included in the lens barrel.

The motor unit 14 is fixed to the guide barrel 60. FIG. 4 is a cross-sectional view of the motor unit 14 along a plane orthogonal to the optical axis. The motor unit 14 includes a motor (not shown) and a drive base plate 50 which is a sheet metal member on which the motor is mounted. In the motor unit 14, an output gear 14g of the motor is contained in and held by the drive base plate 50 and is meshed with a cam ring gear 7p formed on an outer periphery of the cam ring 7. When the cam ring 7 is rotated in accordance with rotation of the output gear 14 driven by the motor, the first cam followers 16 are moved in the optical axis direction due to engagement with the first cam grooves 7a (see FIGS. 5 to 7A), described hereinafter, formed in the cam ring 7. At this time, the first lens-holding member 1 is guided by the linear grooves 60a and linearly moves in the optical axis direction. That is, the moving lens group moves in the optical axis direction. By moving the moving lens group in the optical axis direction according to the distance of an object from the camera, a focus operation is performed between the infinite photographing position and the closest photographing position.

On an object side of the first lens group L1, there is disposed a filter frame 40 in the form of a tubular member to which a filter (not shown) as an example of an optical component can be attached. The filter frame 40 is fixed to a connection barrel 41 with screws. On a front side of the filter frame 40, there is disposed a decorative ring 11 that covers screws for fixing the filter frame 40 to the connection barrel 41 with a view to enhancement of design performance.

An urging spring 25 for urging the first lens-holding member 1 (moving lens group) and the connection barrel 41 in a direction of moving away from each other is disposed between the connection barrel 41 and the first lens-holding member 1. The urging spring 25 has an annular shape surrounding the first lens group L1 and is held by the first lens-holding member 1 at a location on a rear side with respect to the apex of the first lens group L1 on the object side.

On an outer peripheral surface of the connection barrel 41, the second cam followers 41a are formed integrally with the body of the connection barrel 41 at three points in a circumferential direction in a different phase from the first cam followers 16. Further, on the outer peripheral surface of the connection barrel 41, third cam followers 41b are formed integrally with the body of the connection barrel 41 at three points in the circumferential direction in a different phase from the first cam followers 16 and the second cam followers 41a. The second cam followers 41a and the third cam followers 41b each have a truncated cone shape similar to the first cam followers 16. Note that the second cam followers 41a and the third cam followers 41b may be fixed to the body of the connection barrel 41 as separate components similar to the first cam followers 16 which are provided in a state press-fitted in the first lens-holding member 1.

Figure 5:
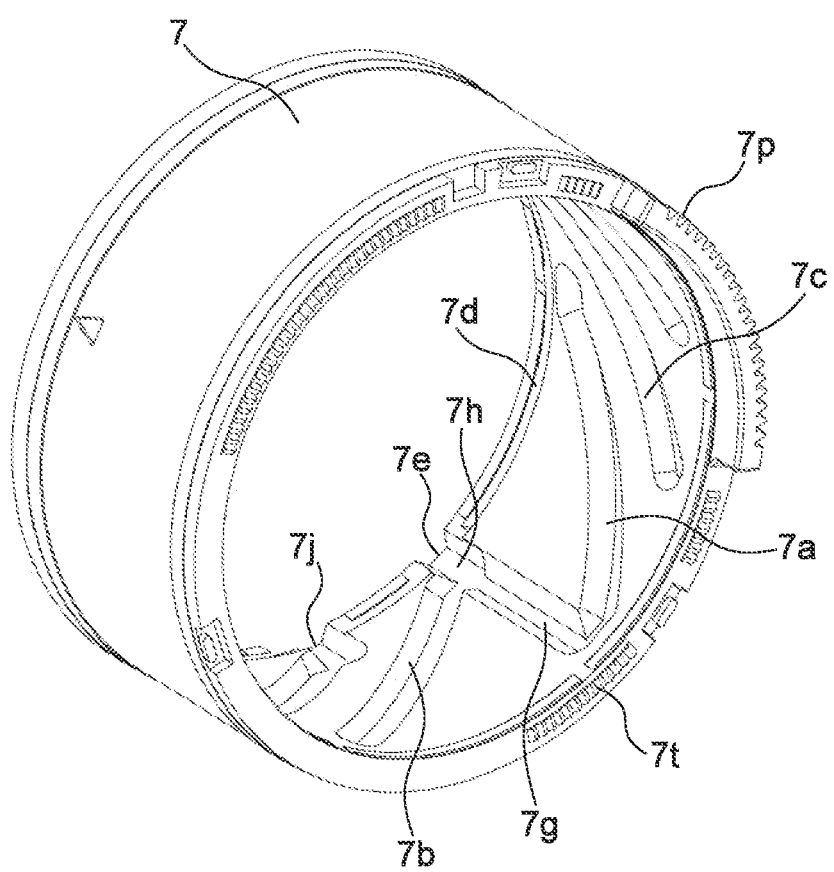
FIG. 5 is an appearance perspective view of a cam ring included in the lens barrel.
Figure 6:
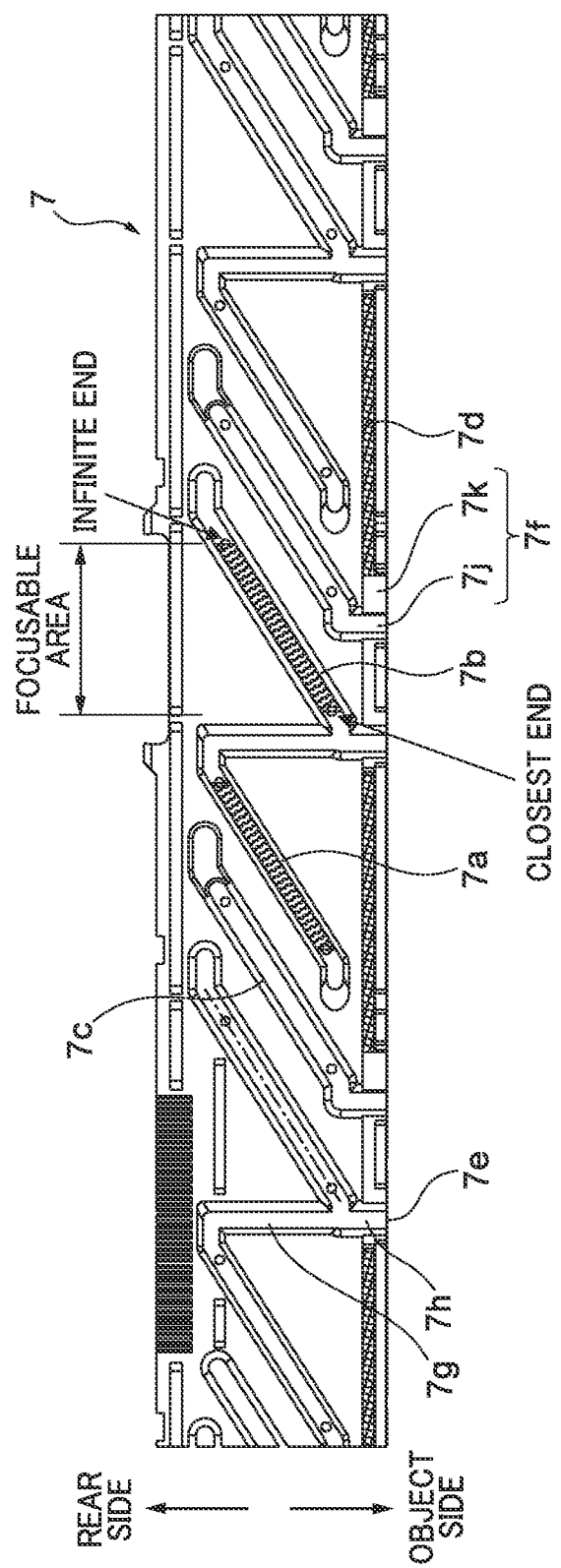
FIG. 6 is a developed plan view of an inner peripheral surface of the cam ring.

FIG. 5 is a perspective view showing the cam ring 7, as viewed from the rear. FIG. 6 is a developed plan view of an inner peripheral surface of the cam ring 7. The inner peripheral surface of the cam ring 7 on the object side is formed with three circumferential grooves 7d extending in the circumferential direction at the same locations in the optical axis direction, and the three circumferential grooves 7d and three protruding portions 60b formed on the outer periphery of the guide barrel 60 are engaged with each other in a one-to-one relation. With this, the cam ring 7 can rotate in a state in which the position thereof in the optical axis direction is restricted with respect to the guide barrel 60.

Figure 7A:
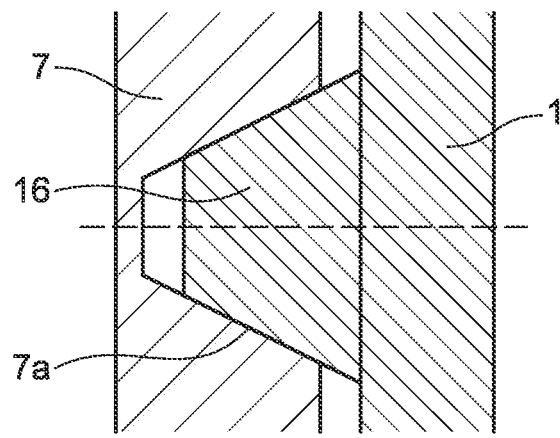
FIGS. 7A to 7C are cross-sectional views each showing a relationship between a cam follower and a cam groove of the cam ring.
Figure 7B:
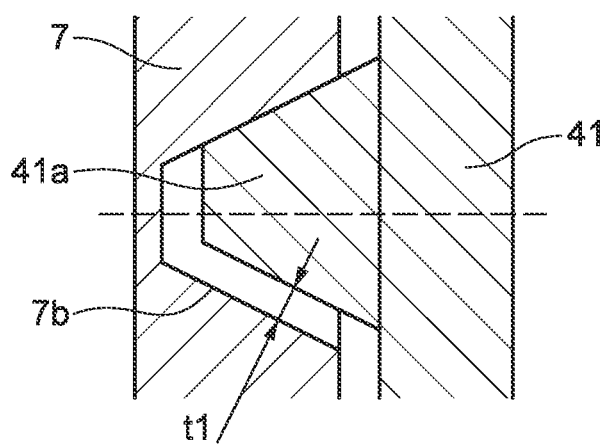
Figure 7C:
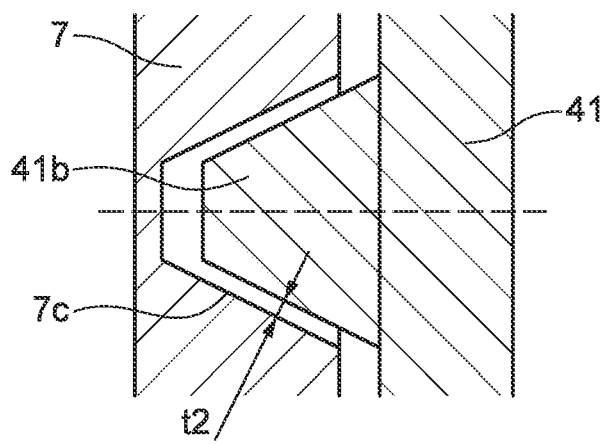

The inner peripheral surface of the cam ring 7 is formed with the three first cam grooves 7a, three second cam grooves 7b, and three third cam grooves 7c which are different in groove width from the second cam grooves 7b, and cam groove surfaces of each cam groove (side surfaces of each cam groove) are formed into a tapered shape (inclined surface) (see FIGS. 7A to 7C). The first cam grooves 7a, the second cam grooves 7b, and the third cam grooves 7c each have a rear side end set as an infinity end at which focusing is performed on an object at infinity and an object side end set as a closest end at which focusing is performed on a closest object. An area between the infinite end and the closest end is a focusable area (photographing area), and the infinite end and the closest end of each cam groove are indicated by white circles in FIG. 6.

A first cam groove introduction portion 7g is formed such that the first cam groove introduction portion 7g extends from an end of each first cam groove 7a on the infinite end side toward the object side (front side) of the cam ring 7 in the optical axis direction and is opened at an object-side end face of the cam ring 7. The first cam groove introduction portion 7g is a groove for causing each first cam follower 16 to be engaged with an associated one of the first cam grooves 7a, i.e. for assembling the moving lens group including the first lens-holding member 1 to the cam ring 7.

A second cam groove introduction portion 7h is formed such that the second cam groove introduction portion 7h extends from an end of each second cam groove 7b on the closest end side toward the object side of the cam ring 7 in the optical axis direction and is opened at the object-side end face of the cam ring 7. The first cam groove introduction portion 7g and the second cam groove introduction portion 7h share a first merging portion 7e on the object side of the cam ring 7. A third cam groove introduction portion 7j is formed such that the third cam groove introduction portion 7j extends from an end of the third cam groove 7c on the closest end side toward the object side of the cam ring 7 in the optical axis direction and is opened at the object-side end face of the cam ring 7. The second cam groove introduction portion 7h and the third cam groove introduction portion 7j are grooves for causing each second cam follower 41a and each third cam follower 41b to be engaged with an associated one of the second cam grooves 7b and an associated one of the third cam grooves 7c, respectively, to thereby assemble the connection barrel 41 to the cam ring 7.

The circumferential grooves 7d are each formed with a circumferential groove introduction portion 7k such that the circumferential groove introduction portion 7k extends toward the object side of the cam ring 7 in the optical axis direction and is opened at the object-side end face of the cam ring 7. The third cam groove introduction portion 7j and the circumferential groove introduction portion 7k share a second merging portion 7f on the object side of the cam ring 7.

With this arrangement, it is possible to reduce the introduction grooves. Further, it is possible to arrange each circumferential groove 7d without being crossed with the first merging portion 7e and the second merging portion 7f, which eliminates the need of increasing the diameter of the cam ring 7 so as to prevent each circumferential groove 7d from crossing with the first merging portion 7e and the second merging portion 7f. Further, the protruding portions 60b are prevented from crossing each cam groove introduction portion when the cam ring 7 rotates along the outer periphery of the guide barrel 60, and hence the protruding portions 60b can smoothly move in the circumferential grooves 7d when the cam ring 7 rotates, which makes it possible to perform smooth focusing.

FIGS. 7A to 7C are cross-sectional views each showing a relationship between a cam groove formed in the cam ring 7 and a cam follower engaged with the cam groove. As shown in FIGS. 7A to 7C, the first cam follower 16, the second cam follower 41a, and the third cam follower 41b are engaged with the first cam groove 7a, the second cam groove 7b, and the third cam groove 7c, respectively.

The first cam groove 7a, the second cam groove 7b, and the third cam groove 7c have the same cam lift-associated depth. The filter frame 40 is not held by the moving lens group but fixed to the connection barrel 41, and hence the filter frame 40 always performs the same movement as that of the moving lens group with the same lift amount, on the front side, which is the object side, of the moving lens group.

The moving lens group, including the first lens-holding member 1, and the connection barrel 41 are urged by the urging spring 25 in a direction of moving away from each other. Therefore, in a normal state, the first cam follower 16 provided on the first lens-holding member 1 is urged against a wall surface of the first cam groove 7a on a side toward the mount 8 (lower side in FIG. 7A). On the other hand, the second cam follower 41a is urged against a wall surface of the second cam groove 7b on a side toward the object (upper side in FIG. 7B). With this, even if the posture of the image capturing apparatus having the lens barrel 100 attached thereto is changed when performing photographing, it is possible to perform photographing without degrading the optical characteristics.

A clearance t1 is formed between the second cam follower 41a and a wall surface of the second cam groove 7b on the side toward the mount 8. Further, the third cam follower 41b is not in contact with the cam surfaces of the third cam groove 7c in the normal state, and a clearance t2 is formed between the third cam follower 41b and a wall surface of the third cam groove 7c on a side toward the mount 8. Here, a relationship expressed by t1≥t2 holds between the clearances t1 and t2.

In a case where an external force, such as impact, is applied from the object side to the filter frame 40, the external force is first transmitted to each engagement portion between the second cam follower 41a provided on the connection barrel 41 disposed on the object side (front side), for holding the filter frame 40, and the second cam groove 7b. Then, the external force is transmitted to each engagement portion between the third cam follower 41b and the third cam groove 7c. At this time, as described above, the clearance t1 is formed between the second cam follower 41a and the wall surface of the second cam groove 7b on the side toward the mount 8, and the clearance t2 is also formed between the third cam follower 41b and the wall surface of the third cam groove 7c on the side toward the mount 8. Therefore, the urging spring 25 is easily compressed, and the impact can be reduced by the urging spring 25, whereby it is possible to prevent the second cam followers 41a from being removed from the second cam grooves 7b and the third cam followers 41b from being removed from the third cam grooves 7c.

Further, the focusable area of the first cam groove 7a and the focusable area of the second cam groove 7b are arranged such that they do not overlap in the optical axis direction (there is a certain distance between the infinite end of the second cam groove 7b and the closest end of the first cam groove 7a in the circumferential direction in FIG. 6). With this, transmission of the external force to the first cam grooves 7a is suppressed. Further, the connection barrel 41 and the moving lens group are engaged independently from the cam ring 7. Therefore, the external force is not transmitted to each engagement portion between the first cam follower 16 and the first cam groove 7a, and the first cam followers 16 and the first cam grooves 7a are prevented from being deformed or damaged, which makes it possible to prevent degradation of the optical performance.

Figure 8:
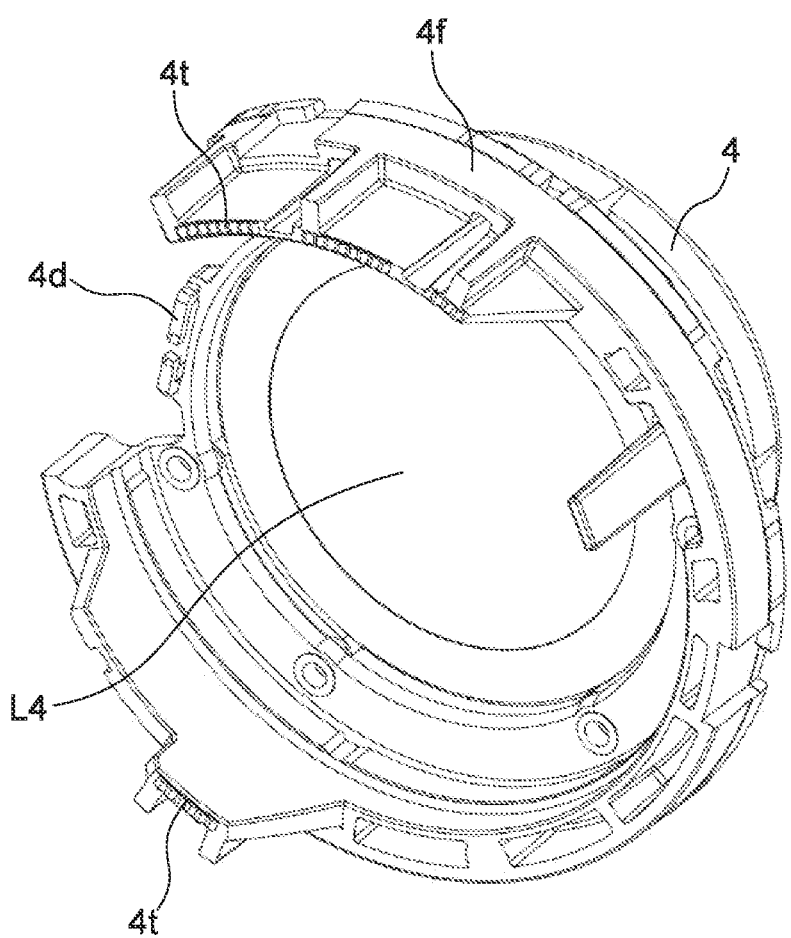
FIG. 8 is a perspective view of a fourth lens-holding member included in the lens barrel.

FIG. 8 is a perspective view of the fourth lens-holding member 4. As shown in FIGS. 2 and 5, part of the cam ring 7, which is opposed to the outer peripheral flange portion 4f, is formed with cam ring-side convex-and-concave portions 7t (first contact portion (hereinafter referred to as the "first convex-and-concave portions 7t")) at a plurality of locations such that they each form an arc shape having the optical axis as the center, as viewed from the optical axis direction. Further, portions of the outer peripheral flange portion 4f formed on the fourth lens-holding member 4, which are opposed to the first convex-and-concave portions 7t, are formed with fourth lens-holding member-side convex-and-concave portions 4t (second contact portion (hereinafter referred to as the "second convex-and-concave portions 4t")).

FIGS. 9A to 9D are side views showing a variety of positional relationships between each first convex-and-concave portion 7t and each second convex-and-concave portion 4t associated therewith (as viewed from a direction orthogonal to the optical axis). FIG. 10 is an enlarged view of an area A in FIG. 9A. As viewed from the direction orthogonal to the optical axis, the first convex-and-concave portion 7t has vertexes 7v and bottoms 7w formed at equally-spaced intervals, and triangular shapes in which inclined surfaces 7s formed between the vertexes 7v and the bottoms 7w form two sides of each triangular shape are continuously formed in the circumferential direction. Similarly, the second convex-and-concave portion 4t has vertexes 4v and bottoms 4w, which are formed at equally-spaced intervals, and triangular shapes in which inclined surface 4s formed between the vertexes 4v and the bottoms 4w form two sides of each triangular shape are continuously formed in the circumferential direction. The first convex-and-concave portion 7t and the second convex-and-concave portion 4t each have the same convex-and-concave shape in which the vertexes of one of the convex-and-concave portions and the bottoms of the other are in contact with each other. That is, when the first convex-and-concave portion 7t and the second convex-and-concave portion 4t are moved in parallel in the optical axis direction from the state shown in FIG. 9A into contact with each other, the inclined surfaces 7s and the inclined surfaces 4s are brought into contact with each other (the vertexes 4v and the bottoms 7w are brought into contact with each other, and the bottoms 4w and the vertexes 7v are brought into contact with each other). Here, an angle formed between each of the inclined surfaces 4s and 7s and the optical axis is defined as an inclination angle, and let it be assumed that the inclination angle of the inclined surface 4s and the inclination angle of the inclined surface 7s are both set as an angle θ.

When the lens barrel 100 normally operates, the first convex-and-concave portion 7t and the second convex-and-concave portion 4t are in a state in which a constant clearance D is maintained as shown in FIG. 10, and the cam ring 7 is rotatable about the optical axis with respect to the fourth lens-holding member 4.

In a case where an external force, such as impact, which cannot be absorbed by the urging spring 25, is applied from the object side to the filter frame 40, the first cam followers 16 attached to the first lens-holding member 1 move toward the rear side in the optical axis direction along the first cam grooves 7a. At this time, a rotational force is generated in the cam ring 7, and the generated rotational force is transmitted to the output gear 14g.

In a case where the motor unit 14 or the output gear 14g is deformed or damaged by the force transmitted to the output gear 14g, the accuracy of transmitting the rotational drive force generated by driving the motor to the cam ring 7 is lowered, which causes an operation failure of the moving lens group.

To cope with this problem, in the lens barrel 100, when the filter frame 40 receives impact from the object side, the cam ring 7 is moved toward the fourth lens-holding member 4 (toward the rear side) in the optical axis direction. Here, since the clearance D is maintained in a state in which the wave washer 19 urges the cam ring 7 toward the rear side, the clearance D is prevented from being easily reduced.

Figure 9A:
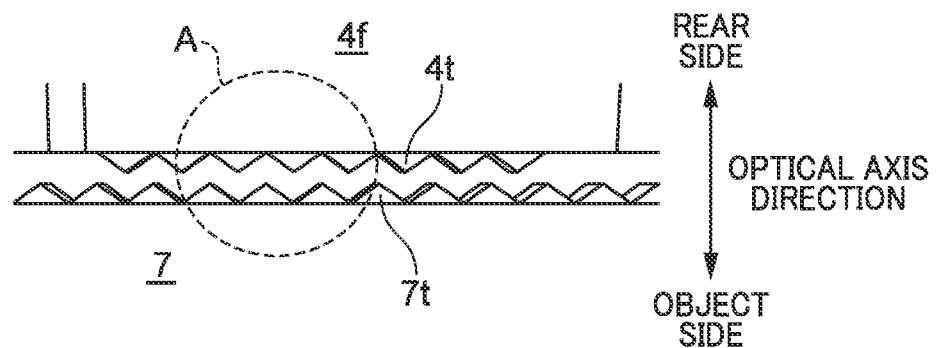
FIGS. 9A to 9D are side views each showing a portion of the fourth lens-holding member and a portion of the cam ring which are opposed to each other.
Figure 9B:
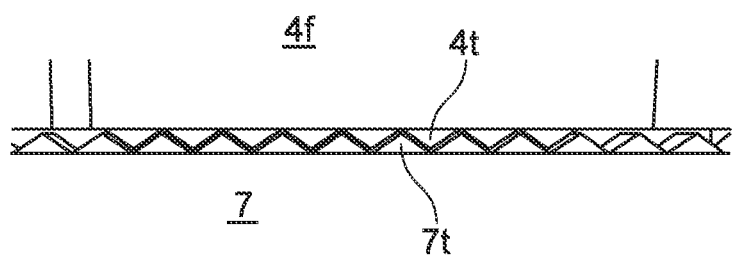
Figure 10:
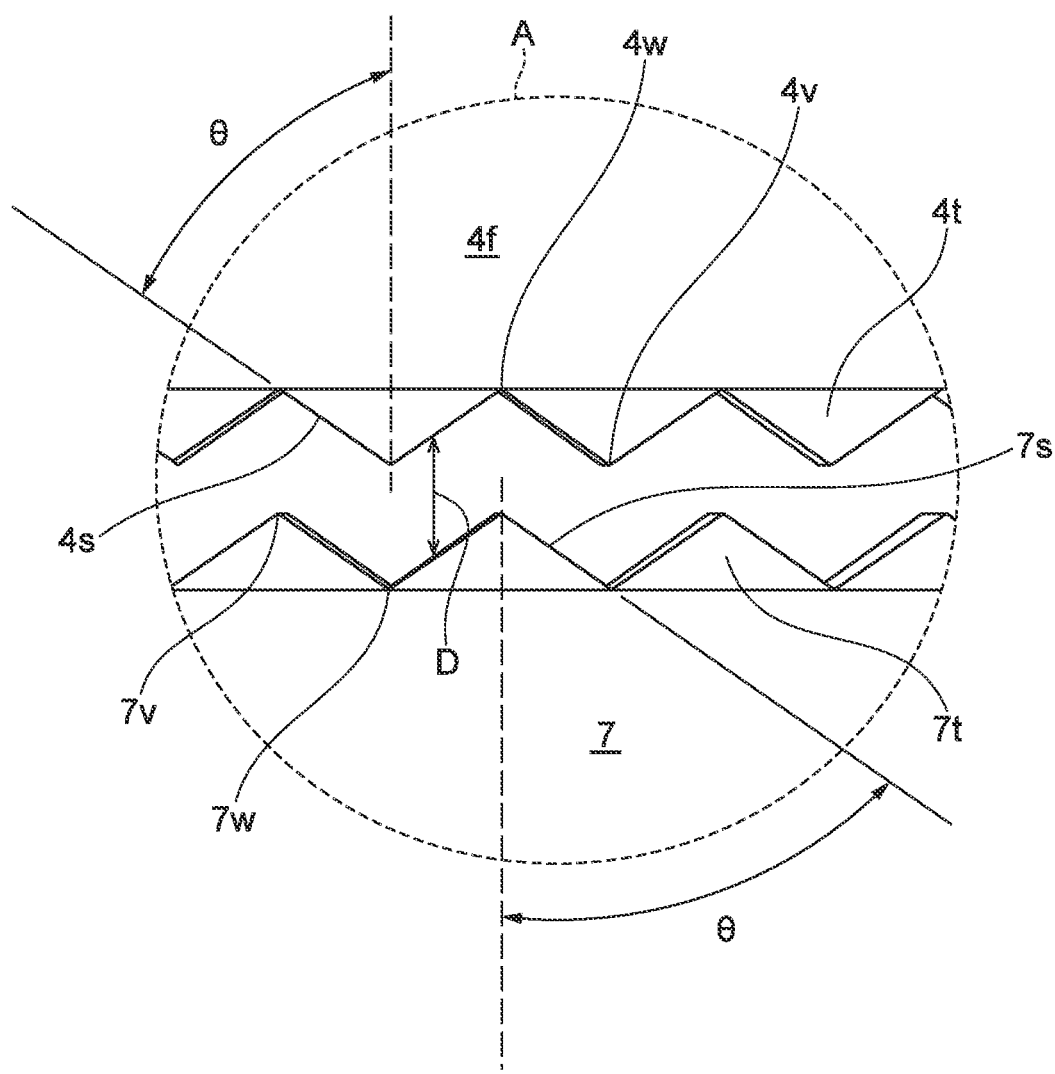
FIG. 10 is an enlarged view of an area A in FIG. 9A.

In a case where a larger external force is applied from the object side to the filter frame 40, as shown in FIG. 9B, the cam ring 7 and the fourth lens-holding member 4 become close to each other in the optical axis direction, whereby the vertexes 7v and the bottoms 4w are engaged with each other, and the vertexes 4v and the bottoms 7w are engaged with each other. Since the vertexes 7v and the bottoms 7w, and the vertexes 4v and the bottoms 4w are formed radially from the optical axis as the center, these can be engaged irrespective of the rotational position of the cam ring 7. Further, the cam ring 7 and the guide barrel 60 are formed of an elastic material, and therefore, the cam ring 7 and the guide barrel 60 are liable to be temporarily deformed when the filter frame 40 receives an external force, such as impact, from the object side, and the second convex-and-concave portions 4t and the first convex-and-concave portions 7t are liable to be engaged with each other. Note that as the elastic material forming the cam ring 7 and the guide barrel 60, there may be mentioned polycarbonate, polyamide, polyacetal, ABS resin, and so forth.

The cam ring 7 having the first convex-and-concave portions 7t is rotatably held by the guide barrel 60, and the fourth lens-holding member 4 having the second convex-and-concave portions 4t is fixed to the guide barrel 60. Therefore, the clearance D where the first convex-and-concave portion 7t and the second convex-and-concave portion 4t can be engaged with each other is not affected by other components, and it is possible to maintain the clearance D with high accuracy.

Figure 9C:
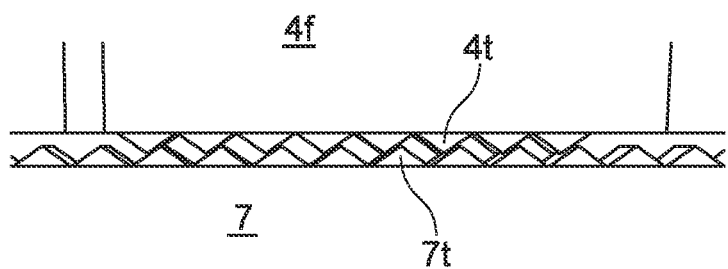
Figure 9D:
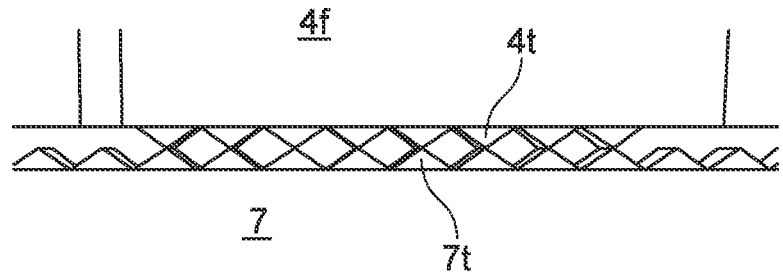

When the first convex-and-concave portions 7t and the second convex-and-concave portions 4t are engaged due to an external force, such as impact, applied from the outside, the cam ring 7 is pushed back in a direction moving away from the fourth lens-holding member 4 by sliding of the inclined surfaces 7s and the inclined surfaces 4s in contact with each other, due to generation of the rotational force of the cam ring 7. Thus, as shown in FIGS. 9C and 9D, the first convex-and-concave portions 7t slide over the second convex-and-concave portions 4t.

At this time, as the angle θ is closer to 0 degrees, the rotational force of the cam ring 7 is harder to be transmitted to the output gear 14g. However, as the angle θ becomes closer to 0 degrees, the impact force from the first cam followers 16 to the cam ring 7 is more transmitted to the first cam grooves 7a without escaping as a force for rotating the cam ring 7, and hence deformation or damage, such as a dent, is liable to occur in the first cam grooves 7a. On the other hand, if the angle θ is made too large, damage is liable to occur in the motor unit 14 and the output gear 14g. By taking these into consideration, it is desirable to set the angle θ to be equal to or larger than 30 degrees and equal to or smaller than 60 degrees.

As described above, by configuring the lens barrel 100 as described above, it is possible to prevent degradation of the optical performance, the operation, and the function of the lens barrel 100 while preventing the cam ring 7, the motor unit 14, and the first cam followers 16 from being damaged.

Figure 11:
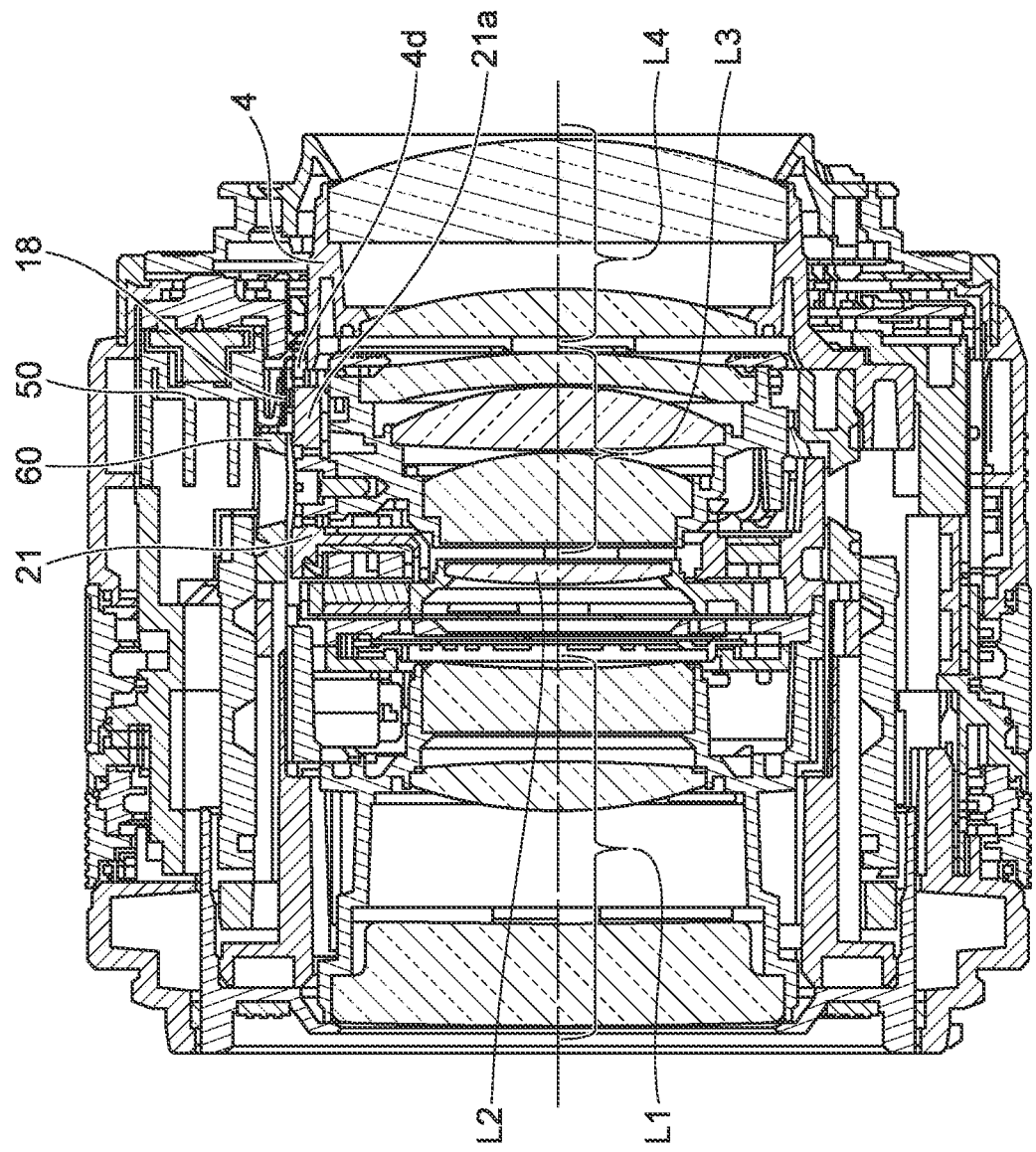
FIG. 11 is a cross-sectional view of the lens barrel including a photo interrupter of and an optical axis.
Figure 12:
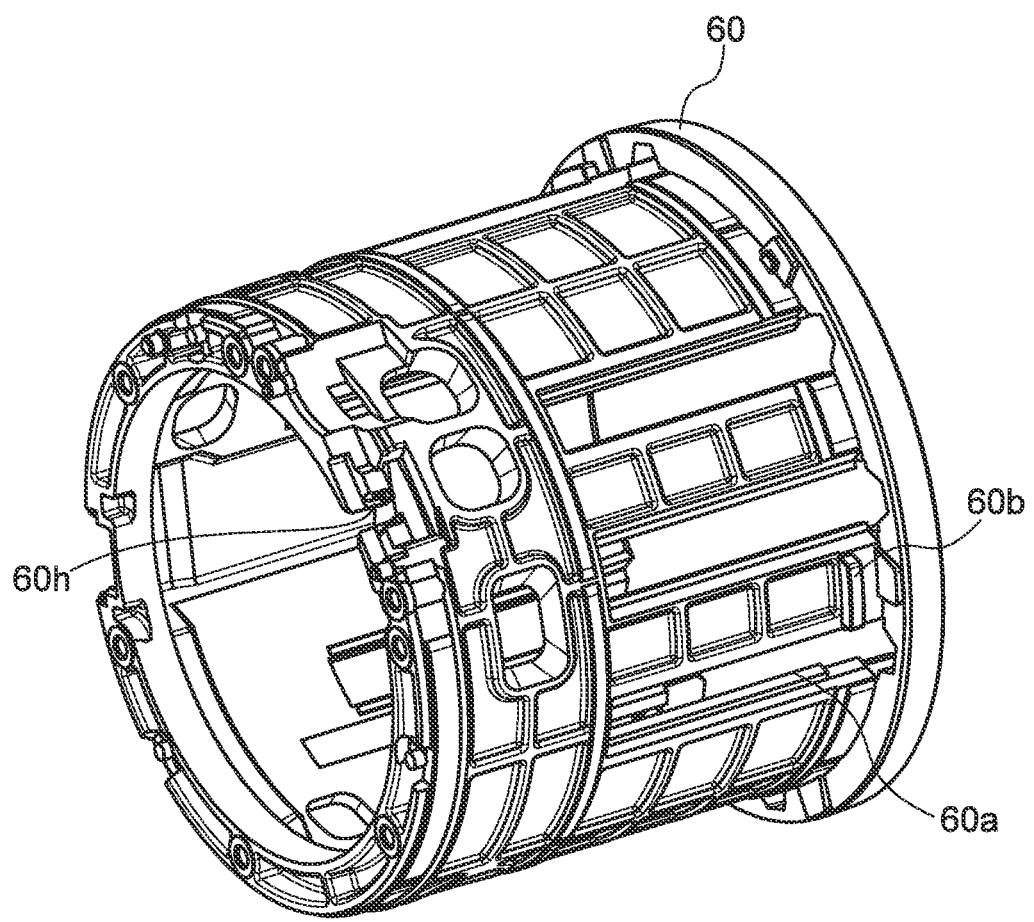
FIG. 12 is a perspective view of a guide barrel included in the lens barrel.

Next, a configuration for detecting the position of the moving lens group will be described. FIG. 11 is a cross-sectional view of the lens barrel 100 including the photo interrupter 18 and the optical axis. FIG. 12 is a perspective view of the guide barrel 60.

The guide barrel 60 is formed with a holding groove 60h whose rear side in the optical axis direction and outer peripheral side in a radial direction (direction orthogonal to the optical axis) are opened. In the holding groove 60h, the photo interrupter 18 (photo sensor) is disposed (accommodated) as a detection unit for detecting a position of the moving lens group. The second lens base plate 21 is formed with a rib 21a, and it is possible to detect a position of the moving lens group using a rectangular wave signal output from the photo interrupter 18 when the rib 21a passes between a light emitting section and a light receiving section of the photo interrupter 18.

Figure 13A:
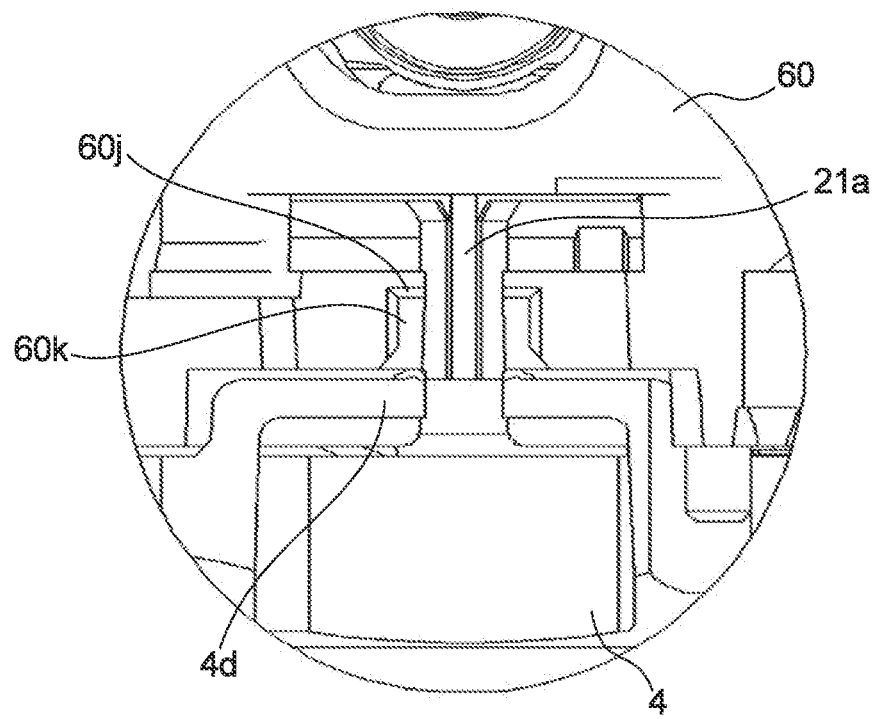
FIGS. 13A and 13B are a side view and a cross-sectional view each showing a disposed state of the photo interrupter, respectively.
Figure 13B:
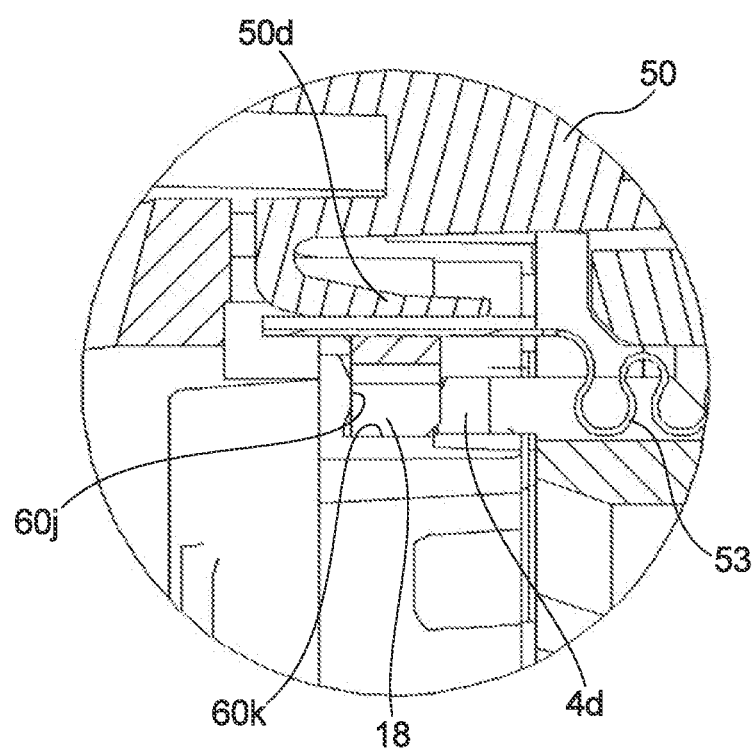

FIGS. 13A and 13B are views each showing a disposed state of the photo interrupter 18. More specifically, FIG. 13A is a side view showing the photo interrupter 18 and its surroundings, and FIG. 13B is a cross-sectional view showing the photo interrupter 18 and its surroundings (enlarged view of the photo interrupter 18 and its surroundings in FIG. 11).

Part of the fourth lens-holding member 4, where the outer periphery flange portion 4f is not formed, is provided with a resilient portion 4d as shown in FIG. 8. When the fourth lens-holding member 4 is fixed to the guide barrel 60, the photo interrupter 18 is urged by the resilient portion 4d against a wall surface 60j, which is formed on the guide barrel 60 such that the wall surface 60j extends approximately orthogonal to the optical axis, toward the object side (left side in FIG. 13B) in the optical axis direction.

The position of the photo interrupter 18 in the optical axis direction is restricted by the two fixing elements of the guide barrel 60 and the fourth lens-holding member 4 that holds the fourth lens group L4 adjacent to the moving lens group, and hence it is possible to detect a position of the moving lens group with high accuracy. Further, the resilient portion 4d is provided at a location not overlapping the fourth lens group L4 in the optical axis direction (not overlapping the fourth lens group L4 when viewed from a direction orthogonal to the optical axis), and hence the influence of deformation of the resilient portion 4d on the optical performance is small.

Further, the drive base plate 50 is formed with a resilient portion 50d on an inner peripheral side close to the optical axis, to urge the photo interrupter 18 held in the holding groove 60h of the guide barrel 60 against a side wall surface 60k which is a bottom surface of the holding groove 60h of the guide barrel 60. Since the cam ring gear 7p is formed on the outer peripheral side of the cam ring 7, it is possible to assemble the lens barrel 100 while urging the photo interrupter 18 against the side wall surface 60k. Size variation of the photo interrupter 18 and variation in the mounting of the photo interrupter 18 on the FPC 53 are absorbed by urging of the resilient portion 50d, and this makes it possible to position the photo interrupter 18 with high accuracy. Further, by disposing the photo interrupter 18 on the guide barrel 60 that holds the moving lens group in a state movable in the optical axis direction, it is possible to fill in a gap between the guide barrel 60 and the rib 21a of the second lens base plate 21 and use the photo interrupter 18 compact in size.

As described above, in the lens barrel 100, the photo interrupter 18 is automatically fixed by disposing the other components essential to realize a predetermined function, at locations adjacent thereto, and assembling them without using a dedicated component as in known art (see e.g. Japanese Laid-Open Patent Publication (Kokai) No. 2019-132938). Therefore, it is possible to realize cost reduction by reducing the number of components and avoid increase in size (increase in diameter), and further, it is possible to provide the lens barrel 100 which is high in assembling operability.

Figure 14A:
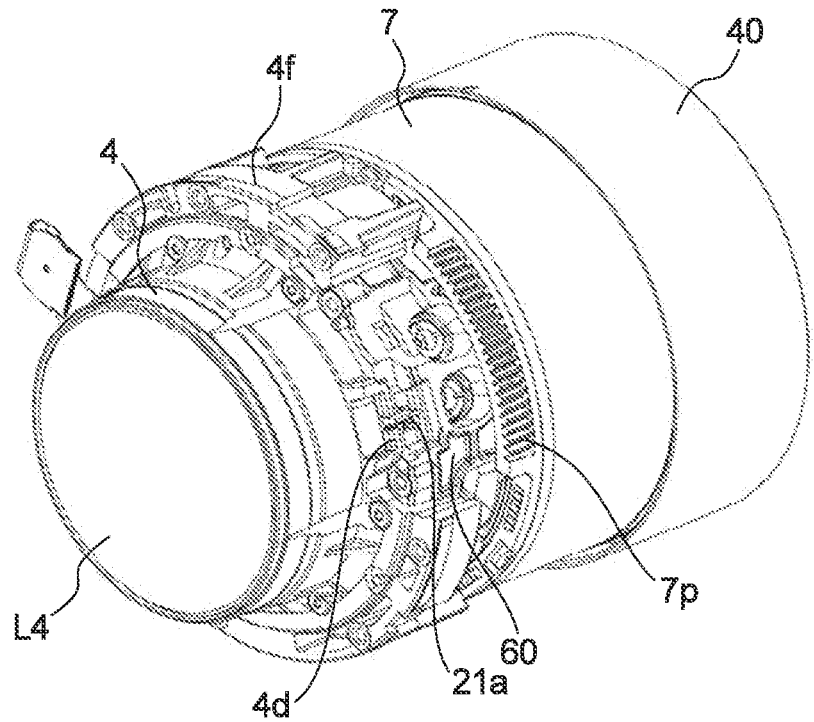
FIGS. 14A and 14B are views of the guide barrel in respective states before and after a motor unit is assembled thereto.
Figure 14B:
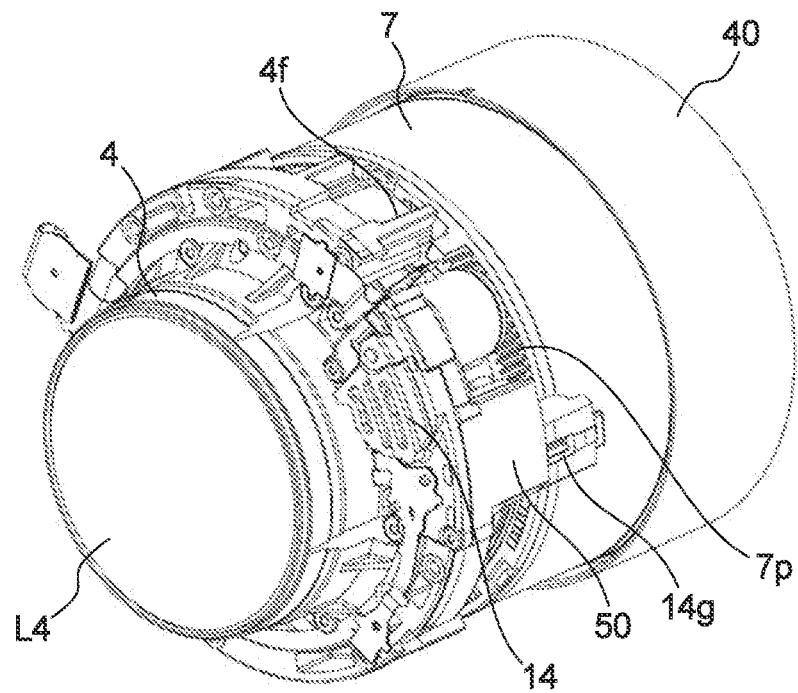

FIG. 14A is a perspective view showing a state before the motor unit 14 is assembled into the guide barrel 60, and FIG. 14B is a perspective view showing a state after the motor unit 14 has been assembled into the guide barrel 60. When the drive base plate 50 is disposed on the outer peripheral side of the fourth lens-holding member 4, where the outer periphery flange portion 4f is not formed (a cutout portion of the outer periphery flange portion 4f), and is held by the guide barrel 60, the cam ring gear 7p and the output gear 14g are meshed with each other at the same time. With this, it is possible to dispose the motor unit 14 at a location close to the optical axis and reduce the size (diameter) of the lens barrel 100.

Although in the above-described embodiment, the moving lens group is formed by the plurality of lens groups and the plurality of lens-holding members for holding these lens groups, the moving lens group may be configured such that at least one lens and at least one holding member for holding this lens are movable in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-092386 filed Jun. 7, 2022, which is hereby incorporated by reference herein in its entirety.

What is claimed is:

1. A lens barrel comprising:
   a first lens;
   a holding member that holds the first lens;
   a guide barrel that guides the holding member such that the holding member is linearly movable in an optical axis direction of the first lens;
   a cam ring that is held such that the cam ring is rotatable about an optical axis of the first lens with respect to the guide barrel and surrounds the guide barrel; and
   a fixed member that holds a second lens different from the first lens and is fixed to the guide barrel,
   wherein the cam ring has a first contact portion that is opposed to the fixed member in the optical axis direction,
   wherein the fixed member has a second contact portion that is opposed to the first contact portion in the optical axis direction, and
   wherein when the cam ring is moved by an external force such that the cam ring approaches the fixed member in the optical axis direction, the first contact portion and the second contact portion are brought into contact with each other, whereby rotation of the cam ring about the optical axis is restricted.

2. The lens barrel according to claim 1, wherein the first contact portion and the second contact portion are each formed such that the first contact portion and the second contact portion are each divided into a plurality of separate positions each having an arc shape about the optical axis, as viewed from the optical axis direction.

3. The lens barrel according to claim 1, wherein the first contact portion and the second contact portion each have an equivalent convex-and-concave portion in which vertexes of one of the first contact portion and the second contact portion and bottoms of the other of the first contact portion and the second contact portion are brought into contact with each other.

4. The lens barrel according to claim 3, wherein, as viewed from a direction orthogonal to the optical axis, the convex-and-concave portion is formed such that the vertexes and the bottoms are formed at equally-spaced intervals, and triangular shapes in which inclined surfaces formed between the vertexes and the bottoms form two sides of each triangular shape are continuously formed in a circumferential direction.

5. The lens barrel according to claim 4, wherein an angle formed between each inclined surface and the optical axis is equal to or larger than 30 degrees and equal to or smaller than 60 degrees.

6. The lens barrel according to claim 1, wherein a plurality of circumferential grooves formed in an inner peripheral surface of the cam ring at same locations in the optical axis direction and a plurality of protruding portions formed on an outer peripheral surface of the guide barrel are engaged with each other, whereby the cam ring is held at a fixed position in the optical axis direction such that the cam ring is rotatable with respect to the guide barrel.

7. The lens barrel according to claim 6, wherein the holding member has a first cam follower protruding to an outer peripheral side of the lens barrel,
   wherein the cam ring has a first cam groove engaged with the first cam follower, and
   wherein the first cam follower is guided by the first cam groove in accordance with rotation of the cam ring, whereby the holding member is moved in the optical axis direction.

8. The lens barrel according to claim 7, further comprising:
   a tubular member that holds a predetermined optical component,
   a connection barrel to which the tubular member is fixed, and
   an urging member that urges the cam ring toward a rear side of the lens barrel, and
   wherein the connection barrel has a second cam follower and a third cam follower each protruding toward the outer peripheral side of the lens barrel,
   wherein the cam ring has a second cam groove that is engaged with the second cam follower and a third cam groove that is engaged with the third cam follower, and
   wherein a first clearance is formed between the second cam follower and a wall surface of the second cam groove on a side toward the rear side of the lens barrel, and a second clearance is formed between the third cam follower and a wall surface of the third cam groove on a side toward the rear side of the lens barrel.

9. The lens barrel according to claim 8, wherein the first clearance is larger than the second clearance.

10. The lens barrel according to claim 8, wherein the cam ring includes:
    a first cam groove introduction portion for causing the first cam follower to be engaged with the first cam groove,
    a first merging portion where the first cam groove introduction portion merges with a second cam groove introduction portion for causing the second cam follower to be engaged with the second cam groove,
    a third cam groove introduction portion for causing the third cam follower to be engaged with the third cam groove, and
    a second merging portion where the third cam groove introduction portion merges with a circumferential groove introduction portion for causing each protruding portion to be engaged with each circumferential groove, and
    wherein the first merging portion and the second merging portion do not cross the circumferential groove.

11. The lens barrel according to claim 1, wherein the fixed member is disposed on a rear side of the cam ring in the optical axis direction.

12. An optical apparatus including a lens barrel,
    wherein the lens barrel comprises:
    a first lens;
    a holding member that holds the first lens;

a guide barrel that guides the holding member such that the holding member is linearly movable in an optical axis direction of the first lens;

a cam ring that is held such that the cam ring is rotatable about an optical axis of the first lens with respect to the guide barrel and surrounds the guide barrel; and a fixed member that holds a second lens different from the first lens and is fixed to the guide barrel, wherein the cam ring has a first contact portion that is opposed to the fixed member in the optical axis direction, wherein the fixed member has a second contact portion that is opposed to the first contact portion in the optical axis direction, and wherein when the cam ring is moved by an external force such that the cam ring approaches the fixed member in the optical axis direction, the first contact portion and the second contact portion are brought into contact with each other, whereby rotation of the cam ring about the optical axis is restricted.

* * * * *